United States Patent Office 3,185,734
Patented May 25, 1965

3,185,734
NOVEL POLYFLUORO-SUBSTITUTED KETONES AND THEIR PREPARATION FROM POLYFLUORO ACID FLUORIDES
Frank S. Fawcett and Ronald D. Smith, Wilmington, Del., assignors to E. I. du Pont de Nemours and Company, Wilmington, Del., a corporation of Delaware
No Drawing. Filed Oct. 25, 1960, Ser. No. 64,727
11 Claims. (Cl. 260—586)

This invention relates to, and has as a principal object, the provision of a novel process for preparing polyfluoro-substituted ketones. A second object is the provision of novel polyfluoro-substituted ketones.

A number of methods have been described for preparing fluoroalkyl ketones (cf., Lovelace, Rausch and Postelnek, "Aliphatic Fluorine Compounds," Reinhold Publishing Corp., New York, 1958, pp. 181–187). Among these methods, those which have been applied to the preparation of perfluoroalkyl ketones include the reaction of perfluoroorganometallic compounds with perfluoroacyl halides or perfluoroalkyl cyanides, the reaction of perfluoroalkanoic esters with sodium, the permanganate oxidation of branched-chain perfluoroolefins, and the direct fluorination of ketoalkanes. However, in summarizing a review of these methods, Lovelace et al. (loc. cit.) stated that no practical synthesis of perfluoroketones was available. Hence, there is a need for new and more practical methods of preparing these products.

We have now discovered a method of making polyfluorinated ketones from readily available polyfluorinated intermediates. This new method for obtaining polyfluoroketones comprises reacting a polyfluoroalkanoic acid fluoride, a polyfluoroalkanedioic acid fluoride, or a polyfluorocycloalkylalkanoic acid fluoride at 50–250° C., in the presence of a fluoride ion-producing compound with a compound of the formula

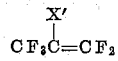

where X' is fluorine or trifluoromethyl.

The polyfluoroacid fluorides, as used herein, refer to compounds of the formula

wherein R is a polyfluoroalkyl, a polyfluorocycloalkyl, or a polyfluoroalkylene group. The number of carbons in the R group is not critical. Exemplary compounds advantageously used are those containing a total of from 2 to 12 chain carbon atoms.

A preferred form of this invention consists in the reaction of a polyfluoroalkanoic, a polyfluoroalkanedioic, or a polyfluorocycloalkylalkanoic acid fluoride at 75°–200° C. with a perfluoroolefin of the above class in a polar organic solvent, preferably an organic nitrile solvent, e.g., acetonitrile, and in the presence of a fluoride ion-producing salt, e.g., a non-oxidizing fluoride or bifluoride of the elements of Group I of the Periodic Table, a non-oxidizing fluoride of a metal of the group consisting of iron, cobalt, nickel, zinc, cadmium, tin, lead, and bismuth, a quaternary ammonium fluoride or a tertiary amine hydrofluoride. Although it is preferred, the use of the solvent is not essential to the process of the invention.

The reaction is conveniently carried out in a closed vessel under the autogenous pressure of the reactants at the reaction temperature. For example, the normally solid or liquid components of the reaction mixture, i.e., the polar solvent when it is used, the fluoride salt catalyst, and, usually the polyfluoro acid fluoride reactant are placed in the open reaction vessel at room temperature. The vessel is then closed, cooled to about −80° C. and evacuated, and then the perfluoroolefin is introduced into the vessel. When the polyfluoro acid fluoride is normally gaseous or low boiling, it and the perfluoroolefin are introduced into the cold evacuated vessel which already contains the normally liquid or solid solvent and fluoride salt. The reaction is then brought about by heating and agitating the mixture under autogenous pressure at the appropriate elevated temperature or temperatures.

To avoid the formation of undesirable by-products, the temperature of the reaction is kept as low as operability permits. Generally, the reactants are heated slowly while being agitated, the heating being conducted by a stepwise procedure wherein the reactants are maintained for short periods of time at increasingly higher temperatures. This procedure permits smooth operation of the process without sudden increases in pressure. However, this procedure is not essential to operability and the reactants can, if desired, be heated in one step to the reaction temperature.

The presence of the polyfluoro acid fluoride assures anhydrous reaction conditions because of the strong reactivity of this type of compound with water. Accordingly, it is advantageous to employ substantially anhydrous reaction components in order to avoid wastage of the fluoride reactant and to insure its availability for reaction with the perfluoroolefin.

The material of which the reaction vessel is constructed is not critical, but it is advantageous to use a reactor which is resistant to attack by any of the components of the reaction mixture, including hydrogen fluoride which might be formed as a result of incidental hydrolysis of the acid fluoride. Metals that are suitably resistant as materials of construction include copper, nickel, Monel and nickel-iron-molybdenum alloys.

The polyfluoro acid fluorides used in the process of this invention can be obtained by methods described by Lovelace et al. (loc. cit.), pp. 220–222. Examples of compounds which are used to advantage are: trifluoroacetyl fluoride, perfluoro-n-butyryl fluoride, perfluoroisobutyryl fluoride, perfluorocyclobutanecarbonyl fluoride, ω-hydroperfluorovaleryl fluoride, oxalyl fluoride and perfluoroglutaryl fluoride.

The invention is illustrated in greater detail in the following examples.

*Example I*

A mixture of 30 g. (0.14 g. mole) of perfluoroisobutyryl fluoride, 21 g. (0.14 g. mole) of hexafluoropropylene, 2 g. of cesium fluoride, and 30 ml. of acetonitrile was heated under autogenous pressure at 100° C. for 8 hours in a 240 ml. pressure vessel constructed of an iron-nickel-molybdenum alloy. The resultant two-phase liquid product was separated, and the heavier layer was distilled to yield 10.2 g. (38%) of bis-(perfluoroisopropyl) ketone, B.P. 70–72° C.

*Example II*

A mixture of 23 g. (0.2 g. mole) of trifluoroacetyl fluoride, 30 g. (0.2 g. mole) of hexafluoropropylene, 2 g. of potassium bifluoride, and 30 ml. of acetonitrile was heated under autogenous pressure at 100° C. for 4 hours and then at 125° C. for 5 hours in a pressure vessel constructed of an iron-nickel-molybdenum alloy. The gaseous product was distilled to give 40.0 g. (75%) of perfluoromethyl perfluoroisopropyl ketone, B.P. 21–22° C.

Analysis for $C_5F_{10}O$:

|  | F |
|---|---|
| Calc'd (wt. percent) | 71.41 |
| Found (wt. percent) | 70.96 |

The structure was verified by the n-m-r and IR spectra.

*Example III*

A mixture of 32 g. (0.15 g. mole) of perfluoro-n-butyryl fluoride, 30 g. (0.2 g. mole) of hexafluoropropylene, 2.0 g. of potassium bifluoride, and 35 ml. of acetonitrile was heated under autogenous pressure at 100° C. for 4 hours and then at 125° C. for 5 hours in a 240 ml. pressure vessel constructed of an iron-nickel-molybdenum alloy. The lower layer of the two-phase liquid product was distilled to give 33.1 g. (60%) of perfluoro-n-propyl perfluoroisopropyl ketone, B.P. 73–75° C.

Analysis for $C_7F_{14}O$:

|  | C | F |
|---|---|---|
| Calc'd (wt. percent) | 22.97 | 72.66 |
| Found (wt. percent) | 23.25 | 72.35 |

*Example IV*

A mixture of 37.2 g. (0.15 g. mole) of ω-hydroperfluorovaleryl fluoride, 30 g. (0.2 g. mole) of hexafluoropropylene, 2.0 g. of potassium bifluoride, and 35 ml. of acetonitrile was heated under autogenous pressure at 100° C. for 4 hours and then at 125° C. for 5 hours in a 145 ml. pressure vessel constructed of an iron-nickel-molybdenum alloy. The lower layer of the two-phase liquid product was distilled to give 38.5 g. (64%) of ω-hydroperfluorobutyl perfluoroisopropyl ketone, B.P. 112–113° C.

Analysis for $C_8HF_{15}O$:

|  | C | H | F |
|---|---|---|---|
| Calc'd (wt. percent) | 24.14 | 0.25 | 71.59 |
| Found (wt. percent) | 24.96 | 0.54 | 71.44 |

*Example V*

A mixture of 30 g. (0.13 g. mole) of perfluorocyclobutanecarbonyl fluoride, 23 g. (0.15 g. mole) of hexafluoropropylene, 2.0 g. of potassium bifluoride, and 30 ml. of acetonitrile was heated under autogenous pressure at 100° C. for 4 hours and then at 125° C. for 5 hours in a 240 ml. pressure vessel constructed of an iron-nickel-molybdenum alloy. The lower layer of the two-phase liquid product was distilled to give 3.81 g. (8%) of perfluorocyclobutyl perfluoroisopropyl ketone,

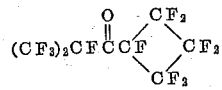

B.P. 87–92° C. The identity of the product was confirmed by n-m-r and infrared analyses.

*Example VI*

A mixture of 12 g. (0.13 g. mole) of oxalyl fluoride, 60 g. (0.4 g. mole) of hexafluoropropylene, 2.0 g. of potassium bifluoride and 50 ml. of acetonitrile was heated under autogenous pressure at 75° C. for 4 hours and then at 100° C. for 5 hours. The lower layer of the two-phase liquid product was distilled to give 7.12 g. of bis-(perfluoroisopropyl) ketone, B.P. 72–75° C., and 14.54 g. (28%) of yellow perfluoro(2,5 - dimethyl - 3,4 - hexanedione),

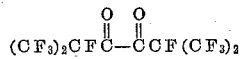

B.P. 91–93° C.

Analysis for $C_8F_{18}O_2$:

|  | C | F |
|---|---|---|
| Calc'd (wt. percent) | 24.38 | 67.50 |
| Found (wt. percent) | 24.47 | 68.56 |

The identity of the diketone was confirmed by n-m-r and infrared analyses.

*Example VII*

A mixture of 24.4 g. (0.1 g. mole) of perfluoroglutaryl fluoride, 40.0 g. (0.27 g. mole) of hexafluoropropylene, 2.0 g. of potassium bifluoride, and 35 ml. of acetonitrile was heated under autogenous pressure at 100° C. for 4 hours and then at 125° C. for 6 hours in a 240 ml. pressure vessel constructed of an iron-nickel-molybdenum alloy. The lower layer of the two-phase liquid product was distilled to give 40.6 g. (75%) of perfluoro-(2,8-dimethyl-3,7-nonanedione),

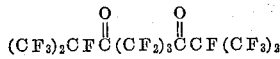

B.P. 148–151° C.

Analysis for $C_{11}F_{20}O_2$:

|  | C | F |
|---|---|---|
| Calc'd (wt. percent) | 24.28 | 69.20 |
| Found (wt. percent) | 24.88 | 70.72 |

The infrared spectrum supported the assigned structure.

*Example VIII*

A mixture of 35 g. of hexafluoropropylene (0.23 g. mole), 18 g. of trifluoroacetyl fluoride (0.15 g. mole), and 9.2 g. of anhydrous cesium fluoride was heated under autogenous pressure at 150° C. for 2 hours, at 175° C. for 2 hours, and then at 200° C. for 10 hours in a 240-ml. pressure vessel constructed of a nickel-iron-molybdenum alloy. The volatile product weighed 42 g. of which 39 g. was distilled to yield 25.8 g. of material boiling at 25–27.5° C. This fraction was identified as perfluoromethyl perfluoroisopropyl ketone by infrared analysis, the calculated overall conversion from trifluoroacetyl fluoride being 69.6%.

A comparison of this example with Example II reveals the beneficial effect of an organic solvent in the process. The use of the solvent in Example II resulted in a somewhat higher yield of the fluoroketone at a lower (125° C. v. 200° C.) maximum reaction temperature.

In the process of this invention, one may use a variety of different solvents in which fluoride ion-producing salts are soluble and which are unreactive with polyfluoroalkanoic, polyfluoroalkanedioic, or polyfluorocycloalkylalkanoic acid fluorides under the conditions of the reaction. Thus, in place of the organic nitrile solvents previously mentioned, there may be employed the following: aliphatic nitro compounds such as nitromethane, ethers such as ethylene glycol dimethyl ether, and sulfones such as tetramethylene sulfone.

Additional examples of acid fluorides which can be reacted with hexafluoropropylene or octafluoroisobutylene, and the resultant products, are:

| Acyl Fluoride | Perfluoroolefin | Product |
|---|---|---|
| Perfluoroheptoyl fluoride | Hexafluoropropylene | Perfluoroisopropyl perfluorohexyl ketone. |
| Do | Octafluoroisobutylene | Perfluoro-t-butyl perfluorohexyl ketone. |
| Perfluorododecanoyl fluoride | Hexafluoropropylene | Perfluoroisopropyl perfluoroundecyl ketone. |
| Chlorodifluoroacetyl fluoride | do | Chlorodifluoromethyl perfluoroisopropyl ketone. |
| β-Chloroperfluoropropionyl fluoride | do | β-Chloroperfluoroethyl perfluoroisopropyl ketone. |
| ω-Chloroperfluoropelargonyl fluoride | do | Perfluoroisopropyl ω-chloroperfluorooctyl ketone. |
| Difluoroacetyl fluoride | do | Difluoromethyl perfluoroisopropyl ketone. |
| Do | Octafluoroisobutylene | Difluoromethyl perfluoro-t-butyl ketone. |
| ω-Hydroperfluoroundecanoyl fluoride | Hexafluoropropylene | Perfluoroisopropyl ω-hydroperfluorodecyl ketone. |
| Perfluoropivaloyl fluoride | do | Perfluoroisopropyl perfluoro-t-butyl ketone. |
| Do | Octafluoroisobutylene | Bis-(perfluoro-t-butyl) ketone. |
| Perfluorocyclohexanecarbonyl fluoride | Hexafluoropropylene | Perfluoroisopropyl perfluorocyclohexyl ketone. |
| Perfluoro(cyclohexylacetyl) fluoride | do | Perfluoroisopropyl perfluoro(cyclohexylmethyl) ketone. |
| Perfluoroadipoyl fluoride | Octafluoroisobutylene | Perfluoro(2,2,9,9-tetramethyl-3,8-decanedione). |

The polyfluorinated ketones of this invention are thermally stable compounds ranging from low boiling liquids to solids, depending on the number of carbon atoms in the molecule. They distill without decomposition, are nonflammable and oxidation resistant, and otherwise possess most of the properties of the well-known stable fluorocarbons. However, these ketones also exhibit good solubility in ordinary alcohols, ethers and esters such as methanol, diethyl ether and ethyl acetate; whereas the corresponding fluorocarbons are insoluble in such solvents. The desirable combination of good solubility and exceptional resistance against thermal and oxidative degradation makes these polyfluoroketones useful as special purpose solvents, e.g., in high temperature polymerizations, or in the preparation of protective coatings by hot-spraying. These compounds are also useful as stable liquids, e.g., as transformer fluids and as fluids for high temperature power transmission devices such as hydraulic systems or liquid coupled mechanical drives. For example, bis-(perfluoroisopropyl) ketone, which has a dielectric constant of 2.1 and the relatively high breakdown potential of 12 kv. at 0.15 atmosphere pressure, is suitable for use as a transformer coolant.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process of preparing polyfluoro-substituted ketones which comprises reacting a compound selected from the group consisting of hexafluoropropylene and octafluoroisobutylene with a compound selected from the group consisting of polyfluoroalkanoic acid fluorides, polyfluoroalkanedioic acid fluorides and polyfluorocycloalkylalkanoic acid fluorides, in the presence of fluoride ions and at a temperature between 50° and 250° C.

2. The process of claim 1 wherein the fluoride ions are provided by at least one member from the group consisting of a fluoride salt, a quaternary ammonium fluoride and a tertiary amine hydrofluoride.

3. The process of claim 1 wherein the fluoride ions are provided by a fluoride of an element of Group I of the Periodic Table.

4. The process of claim 1 wherein the reaction is carried out in the presence of a polar organic solvent.

5. The process of claim 1 wherein the reaction is carried out under the autogenous pressure of the reactants.

6. The process of claim 1 wherein the reaction components are substantially anhydrous.

7. The process of preparing perfluorocyclobutyl perfluoroisopropyl ketone which comprises reacting hexafluoropropylene with perfluorocyclobutanecarbonyl fluoride in the presence of fluoride ions and a polar organic solvent at a temperature of 75°–200° C.

8. The process of preparing perfluoro(2,5-dimethyl-3,4-hexanedione) which comprises reacting hexafluoropropylene with oxalyl fluoride in the presence of fluoride ions and a polar organic solvent at a temperature of 75°–200° C.

9. The process of preparing perfluoro(2,8-dimethyl-3,7-nonanedione) which comprises reacting hexafluoropropylene with perfluoroglutaryl fluoride in the presence of fluoride ions and a polar organic solvent at a temperature of 75°–200° C.

10. The process of preparing perfluoromethyl perfluoroisopropyl ketone which comprises reacting hexafluoropropylene with trifluoroacetyl fluoride in the presence of fluoride ions in a polar solvent at a temperature of 75°–200° C.

11. Perfluoro(2,8-dimethyl-3,7-nonanedione).

References Cited by the Examiner

UNITED STATES PATENTS 2,137,664 11/38 Bayer et al.
2,911,414 11/59 Simmons _____ 260—586 X
3,012,069 12/61 Drysdale.

OTHER REFERENCES

La Zerte et al.: J. Amer. Chem. Soc., vol. 77, pp. 910–913 (1955).

Wellington, Jr., et al., Chem. Abstracts, vol. 54, p. 23,674 (1960).

LORRAINE A. WEINBERGER,
Acting Primary Examiner.

CHARLES B. PARKER, LEON ZITVER, Examiners.